United States Patent
Hegde et al.

(10) Patent No.: US 12,368,662 B2
(45) Date of Patent: Jul. 22, 2025

(54) DYNAMICALLY DETECTING MULTIHOMED NETWORK DEVICES AND ALLOCATING PROTECTION GROUP IDENTIFIERS

(71) Applicant: Juniper Networks, Inc., Sunnyvale, CA (US)

(72) Inventors: Shraddha Hegde, Bangalore (IN); Krzysztof Grzegorz Szarkowicz, Vienna (AT); Zhaohui Zhang, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 402 days.

(21) Appl. No.: 18/149,351

(22) Filed: Jan. 3, 2023

(65) Prior Publication Data
US 2024/0154895 A1    May 9, 2024

(30) Foreign Application Priority Data
Nov. 5, 2022    (IN) .............................. 202241063247

(51) Int. Cl.
*H04L 45/02*    (2022.01)
*H04L 45/00*    (2022.01)

(52) U.S. Cl.
CPC .............. *H04L 45/02* (2013.01); *H04L 45/34* (2013.01)

(58) Field of Classification Search
CPC ................................ H04L 45/02; H04L 45/34
(Continued)

(56) References Cited

U.S. PATENT DOCUMENTS

| 8,724,456 B1* | 5/2014 | Hong .................. G06F 11/3055 370/225 |
| 2015/0109902 A1* | 4/2015 | Kumar ................ H04L 41/0668 370/219 |

(Continued)

FOREIGN PATENT DOCUMENTS

CN         113300949 A      8/2021

OTHER PUBLICATIONS

Extended European Search Report for Application No. EP23161277.1, mailed on Aug. 17, 2023, 79 Pages.
(Continued)

*Primary Examiner* — Anthony Mejia
(74) *Attorney, Agent, or Firm* — Harrity & Harrity, LLP

(57) ABSTRACT

A first network device may receive a first advertisement of a network destination from a second network device and may detect multihoming with the second network device. The second network device may detect the multihoming with the first network device. The first network device and the second network may enable egress protection for the multihoming. The first network device may allocate, from a first pool, a protection group identifier for a group of multihomed network devices and may allocate, from a second pool, a network destination identifier for the network destination. The first network device may provide, to a network and the second network device, a second advertisement that includes the protection group identifier and the network destination identifier. The protection group identifier and the network destination identifier may cause the network to direct traffic for the network destination, via the group of multihomed network devices.

20 Claims, 14 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2016/0119229 A1* | 4/2016 | Zhou | H04L 12/6418 370/392 |
| 2019/0132241 A1 | 5/2019 | Vattem et al. | |
| 2022/0337514 A1* | 10/2022 | Lu | H04L 45/28 |

OTHER PUBLICATIONS

Research Disclosure., "Fast LMA Protection for Proxy Mobile IPv6," Kenneth Mason Publications, vol. 578 (64), Jun. 2012, pp. 1-6. XP007141387.
Sajassi A., et al., "RFC 7432—BGP MPLS-Based Ethernet VPN," Internet Engineering Task Force (IETF), Feb. 2015, 56 pages, XP055303848, URL:https://tools.ietf.org/html/rfc7432.
Shen, Y. et al., "RFC 8679 MPLS Egress Protection Framework," Internet Engineering Task Force, Dec. 2019, 20 pages.

\* cited by examiner

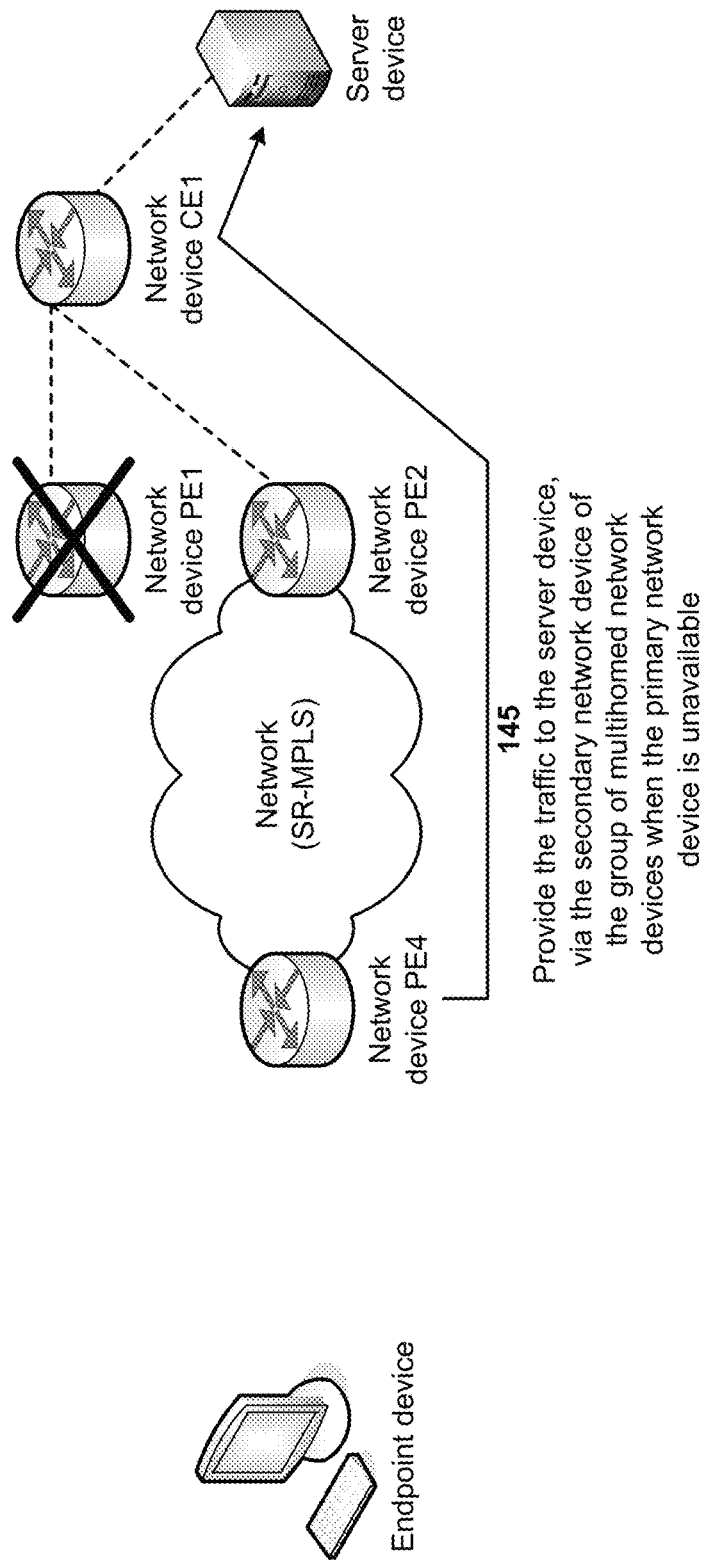

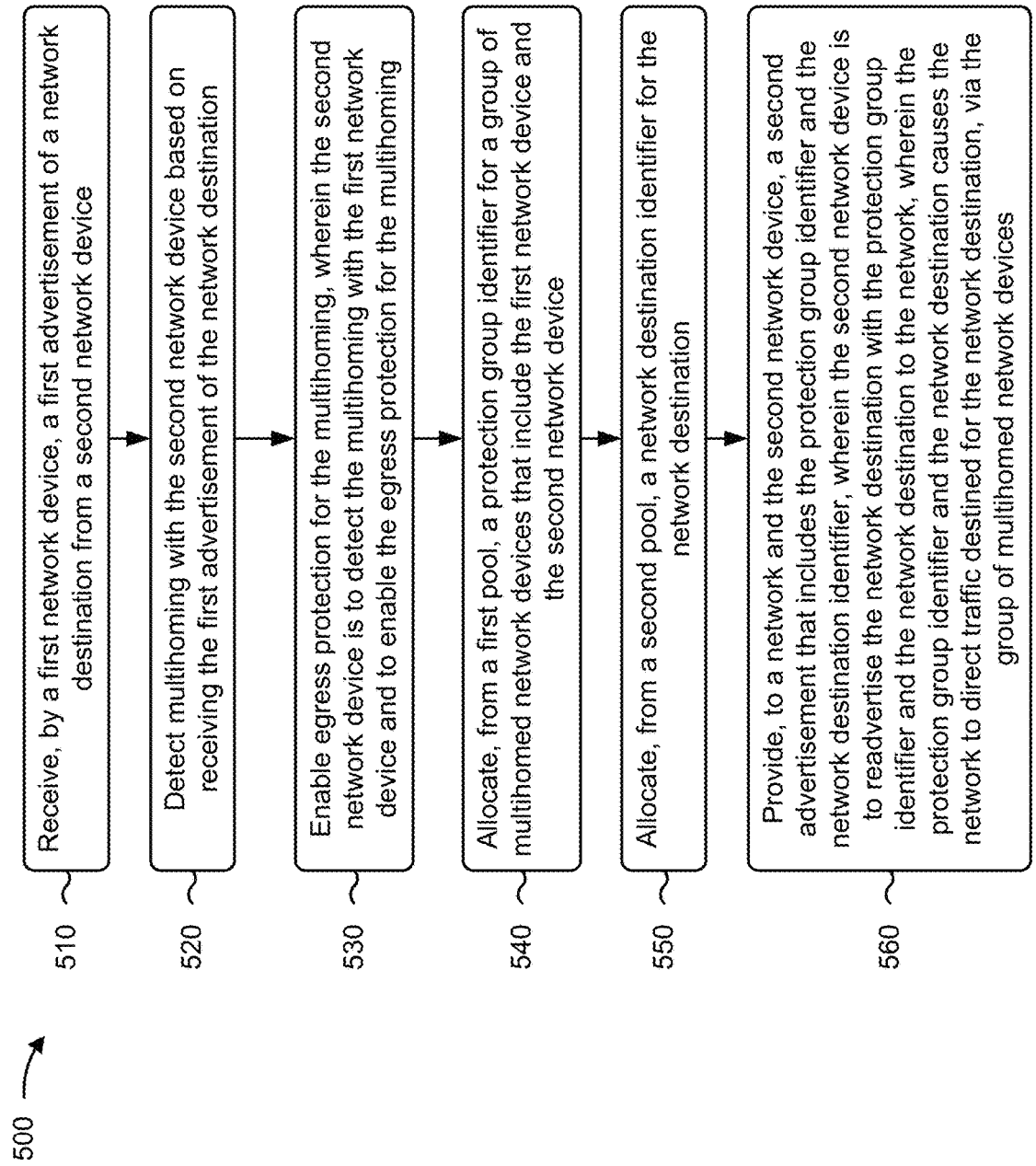

DYNAMICALLY DETECTING MULTIHOMED NETWORK DEVICES AND ALLOCATING PROTECTION GROUP IDENTIFIERS

CROSS-REFERENCE TO RELATED APPLICATION

This Patent Application claims priority to India Patent Application No. 202241063247, filed on Nov. 5, 2022, and entitled DYNAMICALLY DETECTING MULTI-HOMED NETWORK DEVICES AND ALLOCATING CONTEXT IDENTIFIERS." The disclosure of the prior Application is considered part of and is incorporated by reference into this Patent Application.

BACKGROUND

When a customer edge (CE) network device connects to a provider network, the CE network device is multihomed to multiple provider edge (PE) network devices for redundancy. If a PE network device (e.g., an egress node) or a PE network device to CE network device link (e.g., an egress link) fails, the CE network device switches to another PE network device (e.g., a backup PE network device) and receives network connectivity. Certain critical customer services require high reliability and failover times in milliseconds.

SUMMARY

Some implementations described herein relate to a method. The method may include receiving, by a first network device, a first advertisement of a network destination from a second network device and detecting multihoming with the second network device based on receiving the first advertisement of the network destination. The method may include enabling egress protection for the multihoming, where the second network device may detect the multihoming with the first network device and may enable the egress protection for the multihoming. The method may include allocating, from a first pool, a protection group identifier for a group of multihomed network devices that include the first network device and the second network device and allocating, from a second pool, a network destination identifier for the network destination. The method may include providing, to a network and the second network device, a second advertisement that includes the protection group identifier and the network destination identifier. The second network device may readvertise, to the network, the network destination with the protection group identifier and the network destination identifier allocated by the first network device, and may install forwarding state to forward traffic with the protection group identifier and the network destination identifier, allocated by the first network device, to the network destination. The protection group identifier and the network destination identifier may cause the network to direct traffic destined for the network destination, via the group of multihomed network devices.

Some implementations described herein relate to a first network device. The first network device may include one or more memories and one or more processors. The one or more processors may be configured to receive a first advertisement of a network destination from a second network device and detect multihoming with the second network device based on receiving the first advertisement of the network destination. The one or more processors may be configured to enable egress protection for the multihoming, where the second network device may detect the multihoming with the first network device and may enable the egress protection for the multihoming. The one or more processors may be configured to allocate, from a first pool, a protection group identifier for a group of multihomed network devices that include the first network device and the second network device and allocate, from a second pool, a network destination identifier for the network destination. The one or more processors may be configured to provide, to a network and the second network device, a second advertisement that includes the protection group identifier and the network destination identifier. The second network device may readvertise, to the network, the network destination with the protection group identifier and the network destination identifier allocated by the first network device, and may install forwarding state to forward traffic with the protection group identifier and the network destination identifier, allocated by the first network device, to the network destination. The protection group identifier and the network destination identifier may cause the network to direct traffic destined for the network destination, via the group of multihomed network devices.

Some implementations described herein relate to a non-transitory computer-readable medium that stores a set of instructions. The set of instructions, when executed by one or more processors of a first network device, may cause the first network device to receive a first advertisement of a network destination from a second network device and detect multihoming with the second network device based on receiving the first advertisement of the network destination. The set of instructions, when executed by one or more processors of the first network device, may cause the first network device to enable egress protection for the multihoming, where the second network device may detect the multihoming with the first network device and may enable the egress protection for the multihoming. The set of instructions, when executed by one or more processors of the first network device, may cause the first network device to allocate, from a first pool, a protection group identifier for a group of multihomed network devices that include the first network device and the second network device and allocate, from a second pool, a network destination identifier for the network destination. The set of instructions, when executed by one or more processors of the first network device, may cause the first network device to provide, to a network and the second network device, a second advertisement that includes the protection group identifier and the network destination identifier. The second network device may readvertise, to the network, the network destination with the protection group identifier and the network destination identifier allocated by the first network device, and may install forwarding state to forward traffic with the protection group identifier and the network destination identifier, allocated by the first network device, to the network destination. The protection group identifier and the network destination identifier may cause the network to direct traffic destined for the network destination, via the group of multihomed network devices.

BRIEF DESCRIPTION OF THE DRAWINGS

FIGS. 1A-1J are diagrams of an example associated with dynamically detecting multihomed network devices and allocating protection group identifiers.

FIG. 5 is a flowchart of an example process for dynamically detecting multihomed network devices and allocating protection group identifiers.

DETAILED DESCRIPTION

Figure 1A:
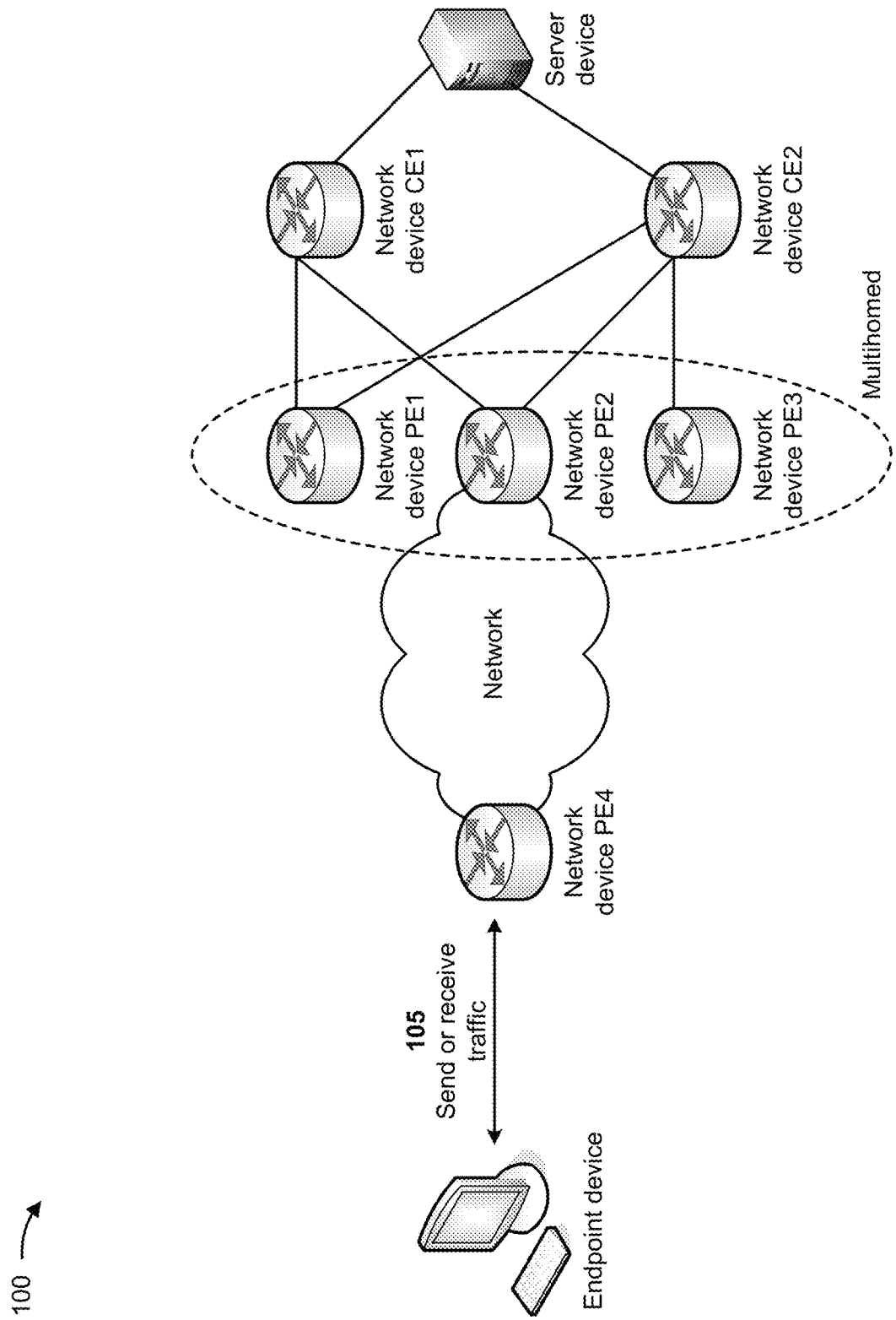

The following detailed description of example implementations refers to the accompanying drawings. The same reference numbers in different drawings may identify the same or similar elements.

The recent growth of cloud technologies has given rise to virtualized service instances that are dynamically deployed and managed. There may be more than one service instance deployed in a data center, where one service instance acts as primary service instance and another service instance acts as a backup service instance. When a primary service instance fails, a PE network device fails, or a PE network device to CE network device link fails, traffic has to switch to the backup service instance, which includes relevant application data for the service. The primary and backup service instances may be instantiated and moved around in a data center based on various system parameters, such as processing usage, memory usage, load, and/or the like. It is difficult to provide egress node and/or egress link protection by manually configuring context in such environments. Current techniques for providing egress node and/or egress link protection create configuration overheads associated with configuring and managing the context identifiers. In virtualized service deployments, where services move around dynamically, it is even more difficult to change configurations when the services move.

Thus, current techniques for providing egress node and/or egress link protection consume computing resources (e.g., processing resources, memory resources, communication resources, and/or the like), networking resources, and/or the like, are associated with delaying traffic transmission through a network due to an egress link failure and/or an egress network device failure, losing traffic due to an egress link failure and/or an egress network device failure, handling lost traffic caused by an egress link failure and/or an egress network device failure, and/or the like.

Some implementations described herein relate to a network device that dynamically detects multihomed network devices and allocates protection group identifiers. For example, a first network device may receive a first advertisement of a network destination from a second network device and may detect multihoming with the second network device based on receiving the first advertisement of the network destination. The first network device may enable egress protection for the multihoming. The second network device may detect the multihoming with the first network device and may enable the egress protection for the multihoming. The first network device may allocate, from a first pool, a protection group identifier for a group of multihomed network devices that include the first network device and the second network device. The first network device may allocate, from a second pool, a network destination identifier for the network destination and may provide, to a network and the second network device, a second advertisement that includes the protection group identifier and the network destination identifier. The second network device may readvertise, to the network, the network destination with the protection group identifier and the network destination identifier allocated by the first network device, and may install forwarding state to forward traffic with the protection group identifier and the network destination identifier, allocated by the first network device, to the network destination. The protection group identifier and the network destination identifier may cause the network to direct traffic destined for the network destination, via the group of multihomed network devices.

In this way, the network device dynamically detects multihomed network devices and allocates protection group identifiers. For example, the network device defines procedures to automate the process of identifying multihomed services and allocating a protection group identifier specific to a group of multihomed network devices. The network device may generate and manage a protection group identifier database, and may generate advertisements with protection group identifier information in the border gateway protocol (BGP). The network device may generate advertisements of protection group identifier pools and anycast segment identifier pools in the interior gateway protocol (IGP) for conflict avoidance, and may provide an efficient solution for segment routing over Internet protocol (IP) version 6 (SRv6) that does not use protection group tables. The network device may also provide a segment routing over multi-protocol label switching (SR-MPLS) solution that avoids context labels with the use of ultimate hop popping (UHP) anycast segment identifiers. Thus, the network device conserves computing resources, networking resources, and/or the like that would otherwise have been consumed by delaying traffic transmission through a network due to an egress link failure and/or an egress network device failure, losing traffic due to an egress link failure and/or an egress network device failure, handling lost traffic caused by an egress link failure and/or an egress network device failure, and/or the like.

FIGS. 1A-1J are diagrams of an example 100 associated with dynamically detecting multihomed network devices and allocating protection group identifiers. As shown in FIGS. 1A-1J, example 100 includes an endpoint device, a server device, and a network with a plurality of network devices. Further details of the endpoint device, the server device, the network, and the network devices are provided elsewhere herein.

As shown in FIG. 1A, the network may be a provider edge (PE) network with PE network devices, such as a first PE network device (PE1), a second PE network device (PE2), a third PE network device (PE3), and a fourth PE network device (PE4). The PE network may be associated with the endpoint device and a customer edge (CE) network that includes CE network devices, such as a first CE network device (CE1) and a second CE network device (CE2). The CE network may be associated with the server device. When a CE network device connects to the PE network, the CE network device may be multihomed to multiple PE network devices for redundancy. For example, the first CE network device may be multihomed with the first PE network device and the second PE network device, and the second CE network device may be multihomed with the first, second, and third PE network devices. If a PE network device or a PE network device to CE network device link (e.g., an egress link) fails, the CE network device may switch to another PE network device (e.g., a backup PE network device) and may receive connectivity with the server device.

As further shown in FIG. 1A, and by reference number 105, the endpoint device may send or receive traffic with the network. For example, the endpoint device may send traffic (e.g., destined for the server device) to the network, and the network may provide the traffic to one of the multihomed PE network devices. The one of the multihomed PE network devices may provide the traffic to one of the CE network devices, and the one of the CE network devices may provide the traffic to the server device. The server device may receive the traffic from the one of the CE network devices. In another example, the server device may send traffic (e.g., destined for the endpoint device) to one of the CE network devices, and the one of the CE network devices may provide the traffic to one of the multihomed PE network devices. The one of the multihomed PE network devices may provide the traffic to the network, and the network may provide the traffic to the endpoint device. The endpoint device may receive the traffic from the network.

Figure 1B:
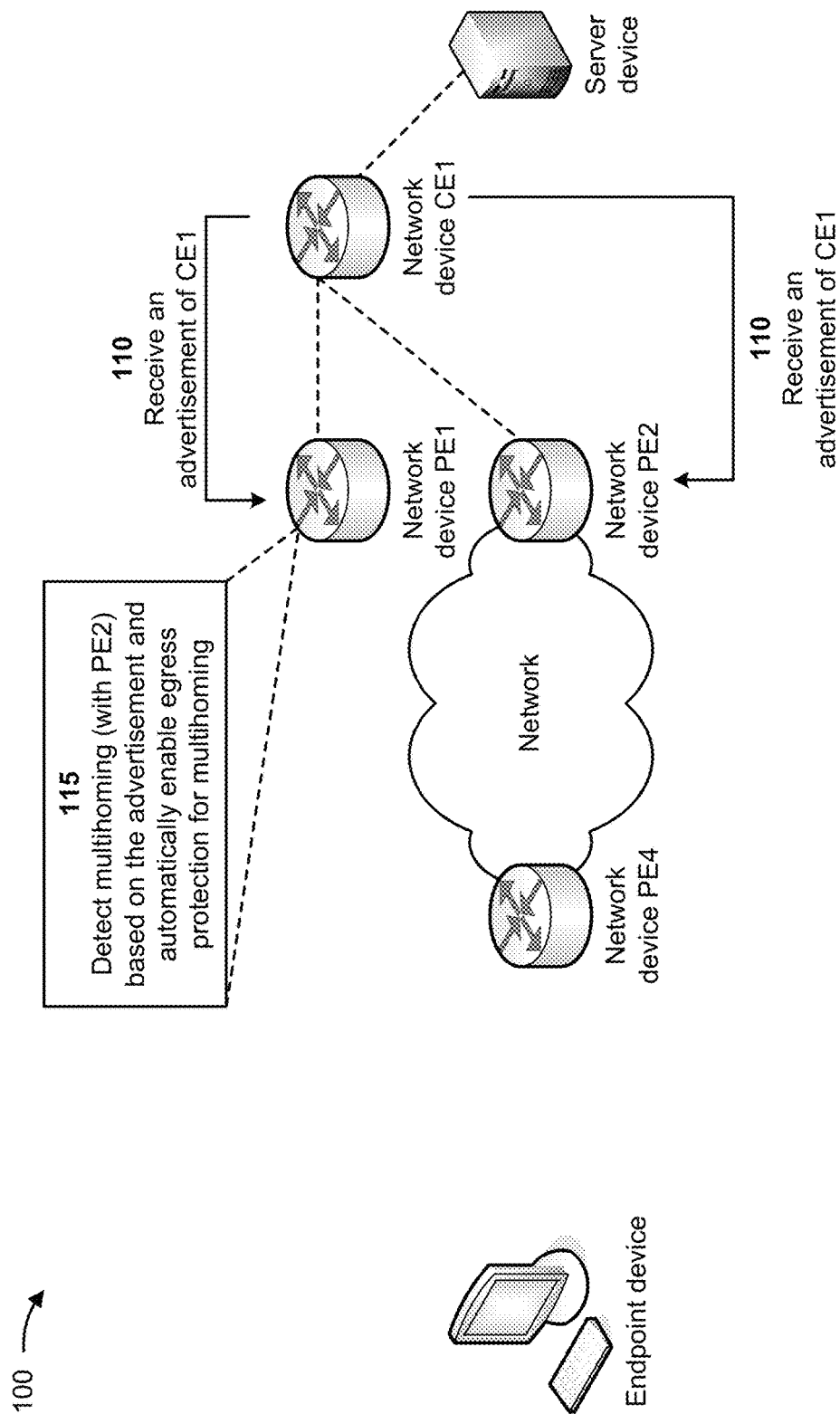

As shown in FIG. 1B, and by reference number 110, the first PE network device may receive an advertisement of a network destination (e.g., a customer site, a customer device, such as the first CE network device, and/or the like), and the second PE network device may receive the advertisement of the first CE network device. For example, when the first CE network device connects to the provider network, the first CE network device may wish to be multihomed to multiple PE network devices for redundancy. In order to be multihomed to multiple PE network devices, the first CE network device may generate an advertisement that includes information identifying the first CE network device. The first CE network device may provide the advertisement of the first CE network device to the first PE network device and the second PE network device. The first PE network device and the second PE network device may receive the advertisement of the first CE network device.

As further shown in FIG. 1B, and by reference number 115, the first PE network device may detect multihoming (e.g., with the second PE network device) based on the advertisement and may automatically enable egress protection for multihoming. For example, when the same information identifying the first CE network device (e.g., a same service prefix) is received by another PE network device (e.g., the second PE network device), the first PE network device may detect multihoming with the second PE network device. Although implementations describe multihoming two PE network devices, in some implementations, more than two PE network devices may be multihomed. In some implementations, the PE network device that detects the multihoming (e.g., the first PE network device) may automatically enable egress protection for multihoming to achieve guaranteed failover. The first PE network device may designate a group of multihomed PE network devices that includes the first PE network device and the second PE network device. The first PE network device may designate the first PE network device as a primary network device of the group and may designate the second PE network device as a secondary (e.g., protector or backup) network device of the group.

Figure 1C:
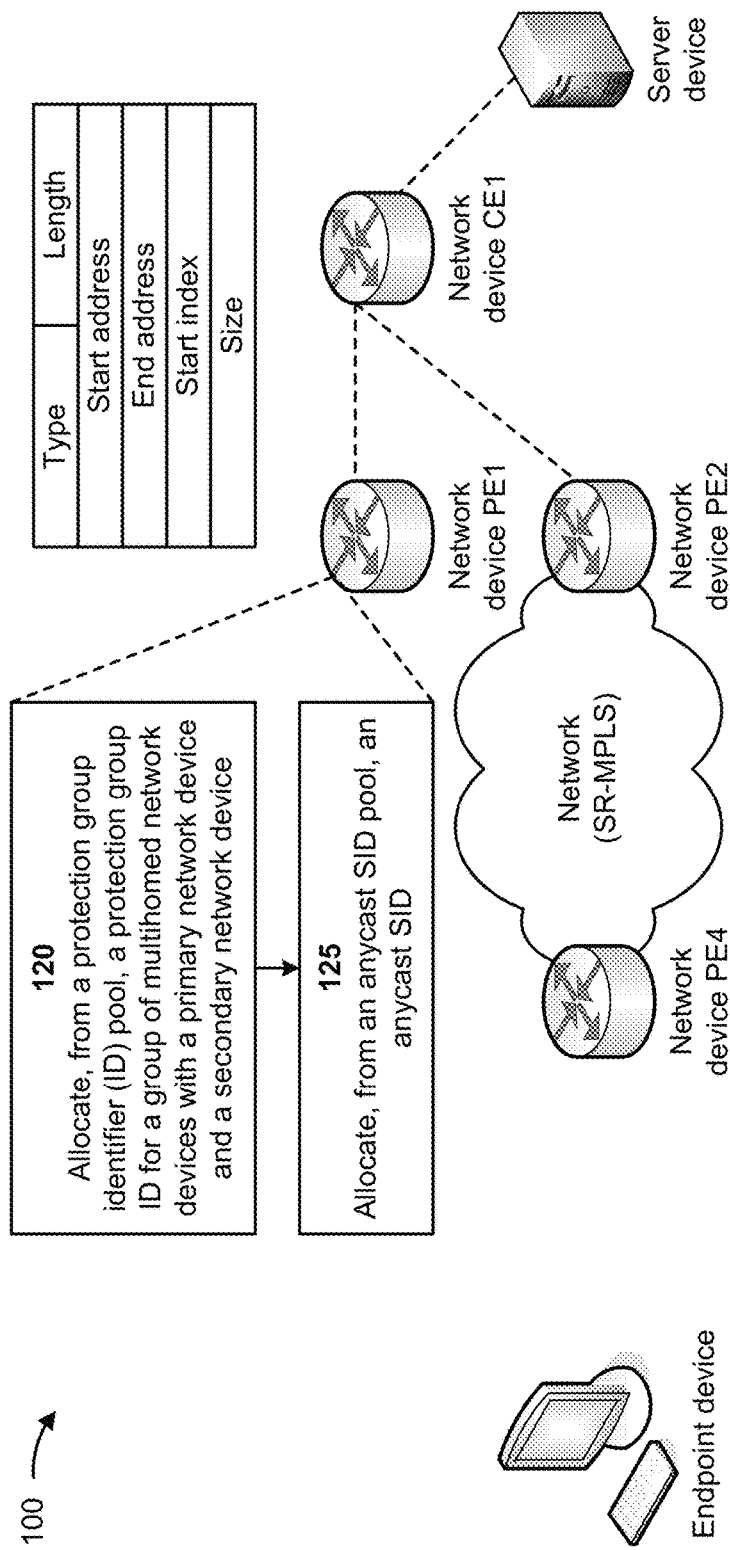

As shown in FIG. 1C, and by reference number 120, the first PE network device may allocate, from a protection group identifier (ID) pool, a protection group ID for a group of multihomed network devices with a primary network device and a secondary network device. For example, the first PE network device may be assigned a protection group identifier pool. The protection group identifier pool may include a set of IP version 4 (IPv4) or IP version 6 (IPv6) addresses. A protection group identifier pool assigned on every PE network device may be disjoint, and protection group identifiers may be dynamically allocated from the protection group identifier pools. In some implementations, the protection group identifier pools may be advertised (e.g., in IGP) to the PE network devices and, if there is a conflict, may be logged. In order to participate in the egress protection, a PE network device may include a valid, non-conflicting protection group identifier pool allocated to the PE network device. As further shown in FIG. 1C, when the network is a segment routing over multi-protocol label switching (SR-MPLS) network, the protection group identifier pool may include a type field, a length field, a start address field, an end address field, a start index field, and a size field.

In some implementations, the first PE network device may allocate, from the protection group identifier pool, the protection group ID for the group of multihomed network devices with the primary network device (e.g., the first PE network device) and a secondary network device (e.g., the second PE network device). The protection group identifier may include an anycast IPv4 or IPv6 address. The protection group identifier may include a unique IPv4 or IPv6 address that is assigned to the multihomed PE network device group, and may be utilized to advertise a service multihoming context into the network. The protection group identifier may be routable inside the network domain, and may be summarized in a segment routing version 6 (SRv6)-based network. In some implementations, protection group identifiers may be advertised in BGP as part of newly-defined edge protection attributes, and may be advertised in IGP.

When multihoming is detected, a PE network device may allocate a protection group identifier from the protection group identifier pool. If the service advertisement (e.g., from the CE network device) already contains an allocated protection group identifier for a same multihomed PE network device group, the same protection group identifier may be allocated on the PE network device that receives the service advertisement. In order to minimize protection group identifier fluctuations, if a PE network device stops advertising a service prefix, other PE network devices may continue to use the same protection group identifier for a configurable amount of time.

In some implementations, the first PE network device may maintain a protection group identifier data structure (e.g., a database, a table, a list, and/or the like) that stores allocated protection group identifiers and associated key information to which the protection group identifiers are allocated. If there is another service prefix that is also advertised by a same PE network device group and a same primary/secondary combination, then the same protection group identifier may be used for this service prefix as well. Content of the protection group identifier database may vary based on a type of forwarding plane being utilized.

As further shown in FIG. 1C, and by reference number 125, the first PE network device may allocate, from an anycast segment identifier (SID) pool, a network destination identifier (e.g., an anycast SID) for the network destination (e.g., the first CE network device). For example, when the network is an SR-MPLS network, an SID may need to be associated with the protection group identifier. Since the protection group identifier is an anycast IP address, a corresponding anycast SID may be assigned by the first PE network device. The anycast SID may be dynamically allocated by the first PE network device when the protection group identifier is allocated. Anycast SIDs may include global SIDs and may avoid conflict with other SIDs allocated by other PE network devices in the network domain. Anycast SIDs (e.g., network destination identifiers) assigned to a protection group identifier may be derived from a dedicated anycast SID pool on each PE network device in order to avoid conflicts. A protection group identifier and an anycast SID associated with the protection group identifier may be advertised as a typical anycast IP and associated anycast SID in IGP.

The anycast SID pool may include a dedicated global index pool allocated to each network device eligible to participate in auto-edge protection. The dedicated index pool may be derived from a segment routing global block (SRGB) on each PE network device. The anycast SID pool may be advertised in IGP. Each PE network device may validate that the anycast SID pool is disjoint from other such advertisements. If there is overlap, the PE network devices with overlapping anycast SID pools may cease participating in egress protection.

Figure 1D:
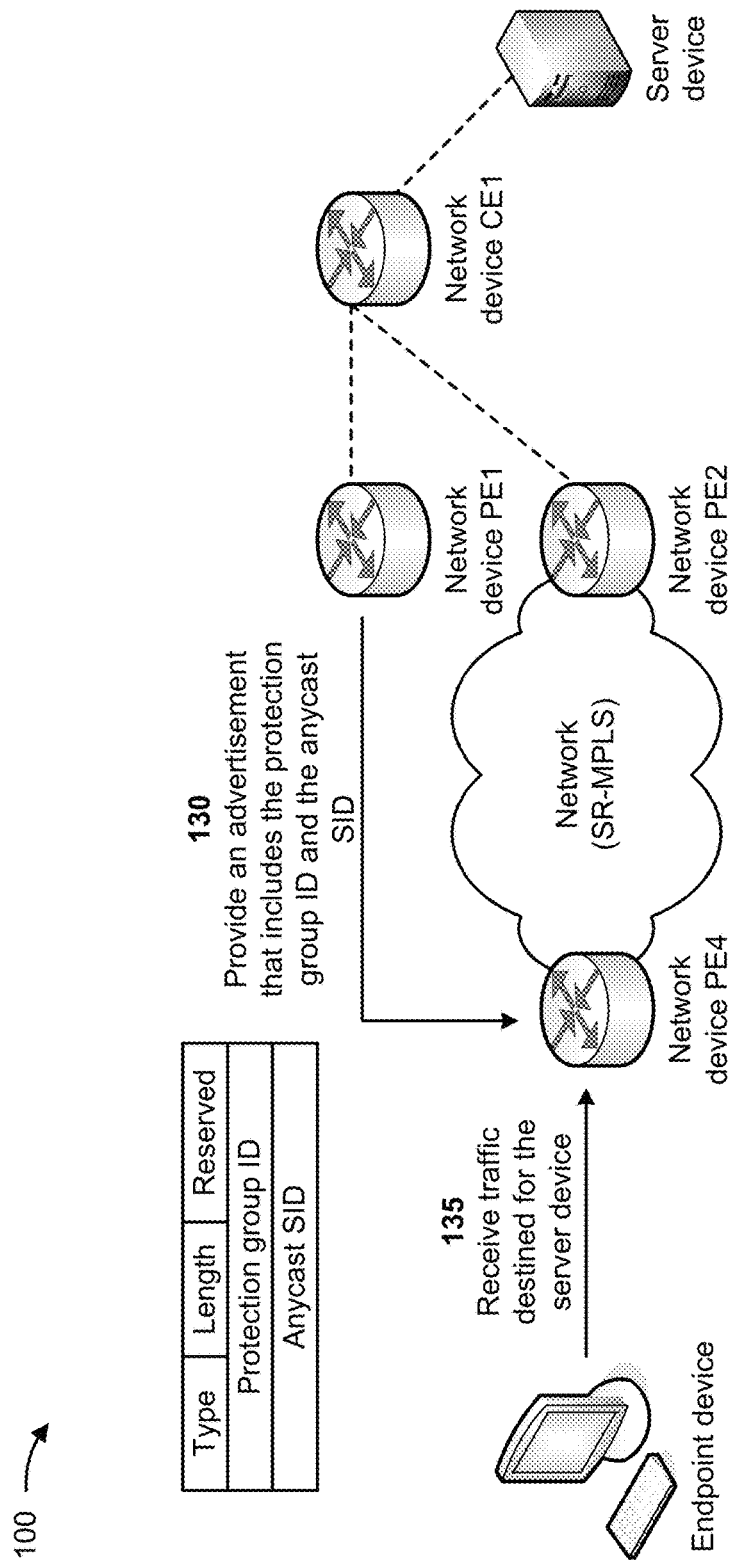

As shown in FIG. 1D, and by reference number 130, the first PE network device may provide an advertisement that includes the protection group ID and the anycast SID (e.g., the network destination identifier). For example, the first PE network device may generate the advertisement (e.g., a service prefix or IGP advertisement) that includes the protection group ID and the anycast SID, and may provide the advertisement to PE network devices included in the network (e.g., the second PE network device, the fourth PE network device, and/or the like). As further shown in FIG. 1D, when the network is an SR-MPLS network, the advertisement may include a type field, a length field, a reserved field, a field for the protection group ID, and a field for the anycast SID. In some implementations, the second PE network device may readvertise the network destination (e.g., the first CE network device) with the protection group identifier and the network destination identifier to the network. In some implementations, the protection group identifier and the network destination identifier may cause the network to direct traffic destined for the network destination, via the group of multihomed network devices.

In some implementations, egress protection may include a co-located protector mode and an alias mode of a protection group identifier advertisement. Segment routing may support equal-cost multi-path (ECMP) routing, and hence there can be one primary network device and one or more protector (e.g., secondary) network devices. A protection group identifier may be allocated for a multihomed group with corresponding roles. When multihoming is detected, a network device that detects the multihoming may allocate a protection group identifier and an anycast SID from a protection group identifier pool and an anycast index pool. These values do not conflict with another network device's protection group identifier and anycast SID allocations as each network device may be assigned unique pools. A service prefix may be advertised with protection group identifier and anycast SID information in attributes. The service prefix may be advertised with a locally allocated service label. IGP may advertise the protection group identifier and the associated anycast SID in a prefix SID advertisement. The IGP advertisement for anycast IP from a primary network device may include a cost of one (1), and the IGP advertisement for anycast IP from protector network devices may include a maximum usable cost. When multihoming is detected on a network device, if the service advertisement already contains a protection group identifier and anycast SID information, the same protection group identifier and anycast SID may be used in a receiving network device.

In cases where two network devices independently allocate different protection group identifiers for a same context, a protection group identifier from the network device with a greatest network device identifier may be utilized and the other network devices may release protection group identifiers allocated by them. The network devices with a protector role may also build protection group tables for the network devices they are protecting. IGP routing tables may be provided for a protection group identifier IP address and an anycast SID. Topology-independent loop-free alternate (TI-LFA) paths may be configured on all network devices except a point of local repair (PLR) network device. Protector network devices may allocate a protection group label for a protection group table and may advertise a mirror SID for the protection group identifier. On PLR network devices, a backup path for the protection group identifier and the anycast SID may include a bottom label protection group label, and top labels may be TI-LFA computed labels for a backup path to the protector network device. A selected protector may be based on a metric, and in cases where there are multiple protector network devices that are equidistant, both backup paths may be installed with a corresponding protection group label. An ingress network may receive a service advertisement along with protection group identifier information and may utilize an associated protection group identifier tunnel to forward traffic. If there is a failure of a primary network device, a PLR network device may switch the traffic toward the protector network device in milliseconds, as the backup paths are already configured in the forwarding plane.

The first PE network device may avoid context labels in SR-MPLS networks. For example, the first PE network device may provide a solution without requiring context label advertisement from protector network devices. This mechanism has an advantage that the PLR network devices need not be upgraded for the solution. Anycast SIDs advertised from both primary and protector network devices may be advertised as ultimate hop popping (UHP). Anycast labels may be configured to lookup a primary MPLS table on the primary network device and on the protector network devices. These anycast labels may be configured to point to the protection group table of the primary network device. As the anycast IP and anycast SIDs may be specifically assigned for the protection group identifier of the multihomed PE network device group, there is no need to assign a separate context label.

As further shown in FIG. 1D, and by reference number 135, a network device of the PE network may receive traffic destined for the server device. For example, the endpoint device may generate traffic destined for the server device, and may provide the traffic to the network. A network device (e.g., the fourth PE network device) of the network may receive the traffic from the endpoint device. The fourth PE network device may determine that the group of multihomed network devices is to be utilized for routing the traffic based on the server device being the destination for the traffic. The fourth PE network device may determine whether the primary network device (e.g., the first PE network device) of the group of multihomed network devices is available. In some implementations, the fourth PE network device may determine that the primary network device of the group of multihomed network devices is available. Alternatively, the fourth PE network device may determine that the primary network device of the group of multihomed network devices is unavailable.

Figure 1E:
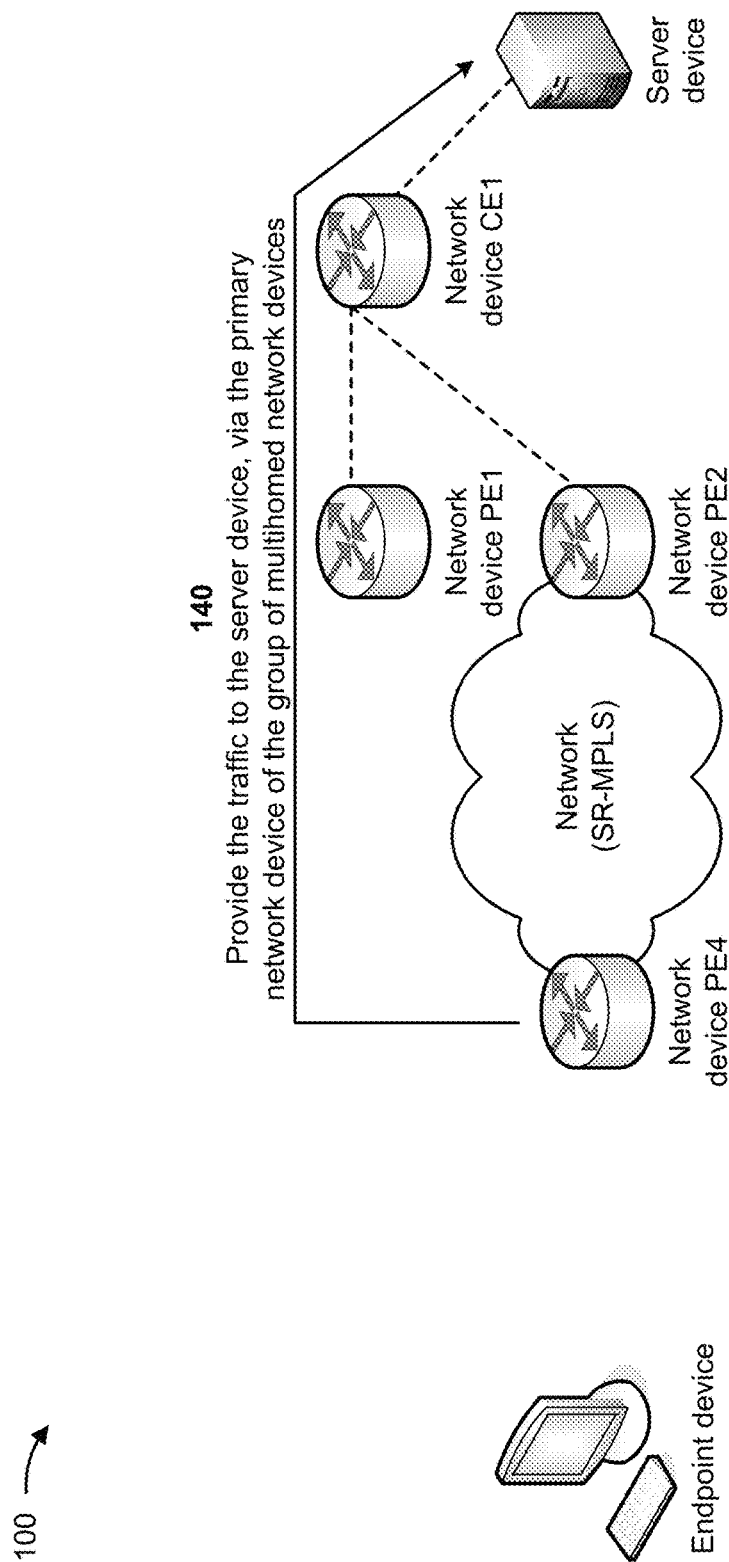

As shown in FIG. 1E, and by reference number 140, the network device of the PE network may provide the traffic to the server device, via the primary network device of the group of multihomed network devices. For example, when the fourth PE network device determines that the primary network device (e.g., the first PE network device) of the group of multihomed network devices is available, the fourth PE network device may provide the traffic through the network and to the first PE network device. The first PE network device may provide the traffic to the first CE network device, and the first CE network device may provide the traffic to the server device.

As shown in FIG. 1F, and by reference number 145, the network device of the PE network may provide the traffic to the server device, via the secondary network device of the group of multihomed network devices, when the primary network device is unavailable. For example, when the fourth PE network device determines that the primary network device (e.g., the first PE network device) of the group of multihomed network devices is unavailable, the fourth PE network device may provide the traffic through the network and to the second PE network device. The second PE network device may provide the traffic to the first CE network device, and the first CE network device may provide the traffic to the server device.

Figure 1G:
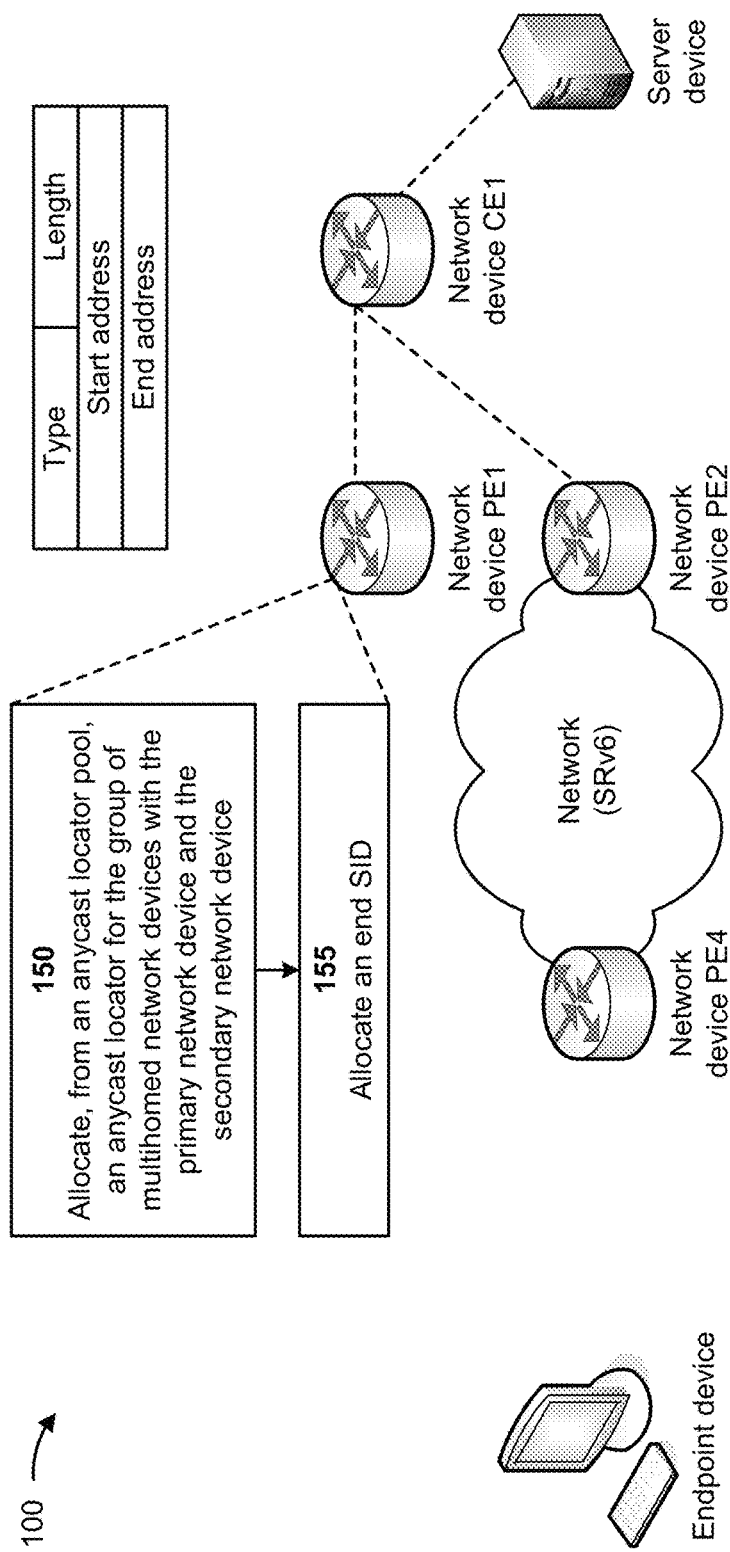

As shown in FIG. 1G, and by reference number 150, the first PE network device may allocate, from an anycast locator pool, an anycast locator for the group of multihomed network devices with the primary network device and the secondary network device. For example, when the network is an SRv6 network, the first PE network device may be associated with an anycast locator pool, and an anycast locator pool may be configured on every PE network device. In case of a micro SID, a micro number ($\mu N$) pool may be configured on every PE network device instead of an anycast locator pool. A $\mu N$ pool may be derived from the global SID space. Anycast locator or $\mu N$ pools may be disjoint and may not overlap across PE network devices. Every PE network device may advertise a configured anycast locator pool or $\mu N$ pool in IGP. If there is overlap in advertised pools, the PE network devices that advertise overlapping pools may cease participating in edge protection. In some implementations, the first PE network device may allocate, from the anycast locator pool, the anycast locator for the group of multihomed network devices with the primary network device and the secondary network device. In an SRv6 network, a separate SID pool is not required, as all of the allocated SIDs may be derived from the anycast locator pool or the $\mu N$ pool and will not conflict due to disjointedness of the pools. As further shown in FIG. 1G, when the network is an SRv6 network, the anycast locator pool may include a type field, a length field, a start address field, and an end address field.

For egress protection, disjoint anycast locator/$\mu N$ pools may be configured on each PE network device and advertised in IGP. Eligibility to participate in egress protection may be evaluated. A service prefix may be advertised with a single homed anycast locator and SID. When the same service prefix is received on another PE network device, via a CE network device, multihoming may be detected. The PE network device that detects multihoming (e.g., a primary or a protector) may allocate a new anycast locator/$\mu N$ from the pool.

As further shown in FIG. 1G, and by reference number 155, the first PE network device may allocate an end SID. For example, the first PE network device may allocate an end SID and a service SID (e.g., SID END.DT4/END.DT6/uDT4/uDT6) from the allocated anycast locator. A service SID and protection group information may be advertised in the service prefix. The allocated anycast locator and end SID may be advertised in IGP. All other PE network devices that are part of the multihomed group may receive the service advertisement and may also detect multihoming. The other PE network devices may allocate the same anycast locator and service SID and may advertise the service with a new SID and the protection group information.

Figure 1H:
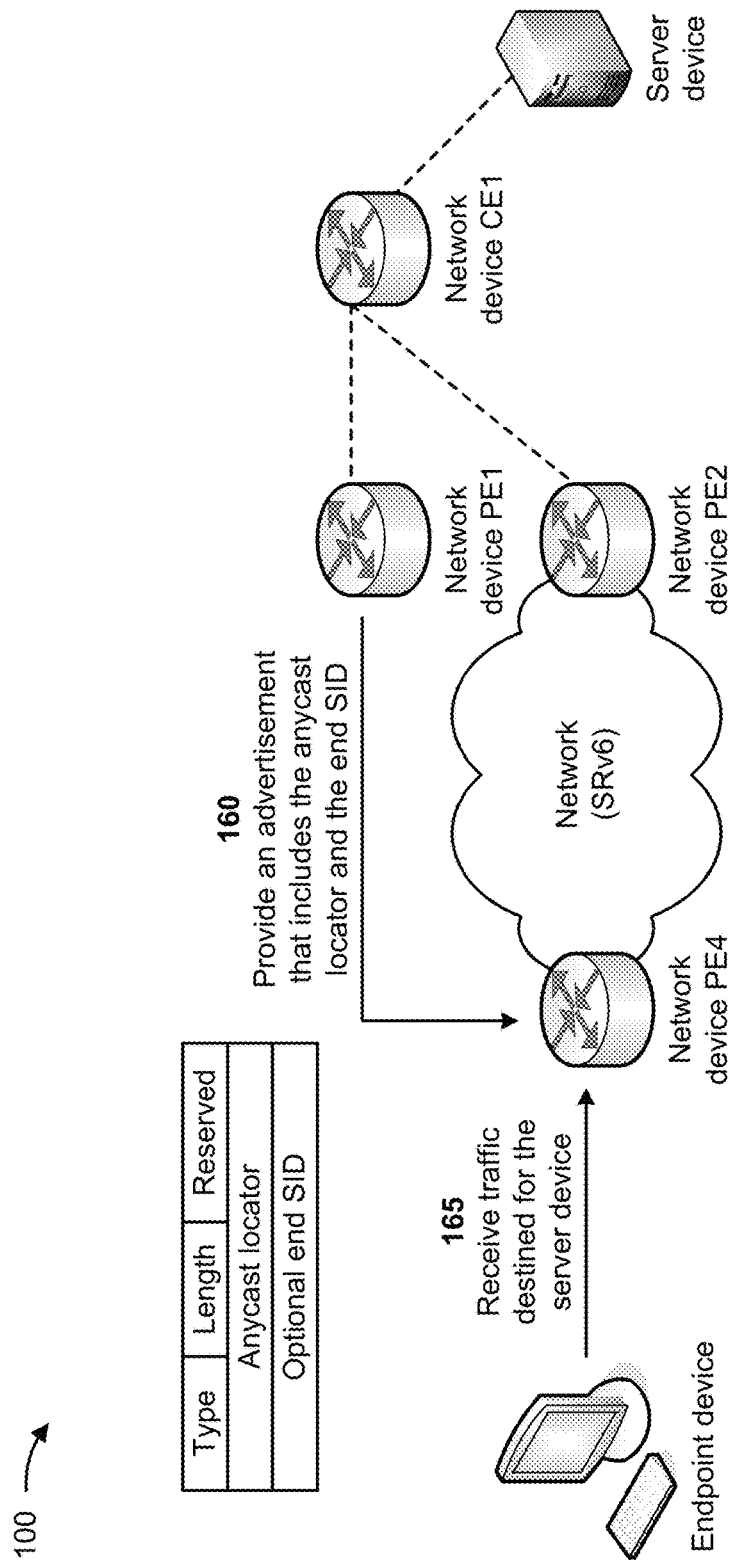

As shown in FIG. 1H, and by reference number 160, the first PE network device may provide an advertisement that includes the anycast locator and the end SID. For example, the first PE network device may generate the advertisement (e.g., a service prefix or IGP advertisement) that includes the anycast locator and the end SID and may provide the advertisement to PE network devices included in the network (e.g., the fourth PE network device). As further shown in FIG. 1H, when the network is an SRv6 network, the advertisement may include a type field, a length field, a reserved field, a field for the anycast locator, and a field for the optional end SID.

All PE network devices in a multihomed group may advertise the anycast locator/anycast $\mu N$ and the end SID. As all of the PE network devices are advertising the same service SID, there is no need to build a protection group table and no need to allocate a mirror SID. An IGP network may build a primary path and a backup path for the anycast locator/uN. An ingress network device (e.g., the fourth PE network device) may receive the service prefix with protection group identifier information and may utilize a tunnel corresponding to the anycast locator. The tunnel may be a best effort IGP tunnel or an SRv6-traffic engineered (TE) tunnel, since the procedures for protection are identical for both. If the egress network device goes down, the PLR network device has a backup path configured to the anycast locator advertised by the protector PE network device. The traffic will switch to the alternate PE network device and the failover may provide local protection with a failover time in milliseconds.

As further shown in FIG. 1H, and by reference number 165, a network device of the PE network may receive traffic destined for the server device. For example, the endpoint device may generate traffic destined for the server device, and may provide the traffic to the network. A network device (e.g., the fourth PE network device) of the network may receive the traffic from the endpoint device. The fourth PE network device may determine that the group of multihomed network devices is to be utilized for routing the traffic based on the server device being the destination for the traffic. The fourth PE network device may determine whether the primary network device (e.g., the first PE network device) of the group of multihomed network devices is available. In some implementations, the fourth PE network device may determine that the primary network device of the group of multihomed network devices is available. Alternatively, the fourth PE network device may determine that the primary network device of the group of multihomed network devices is unavailable.

Figure 1I:
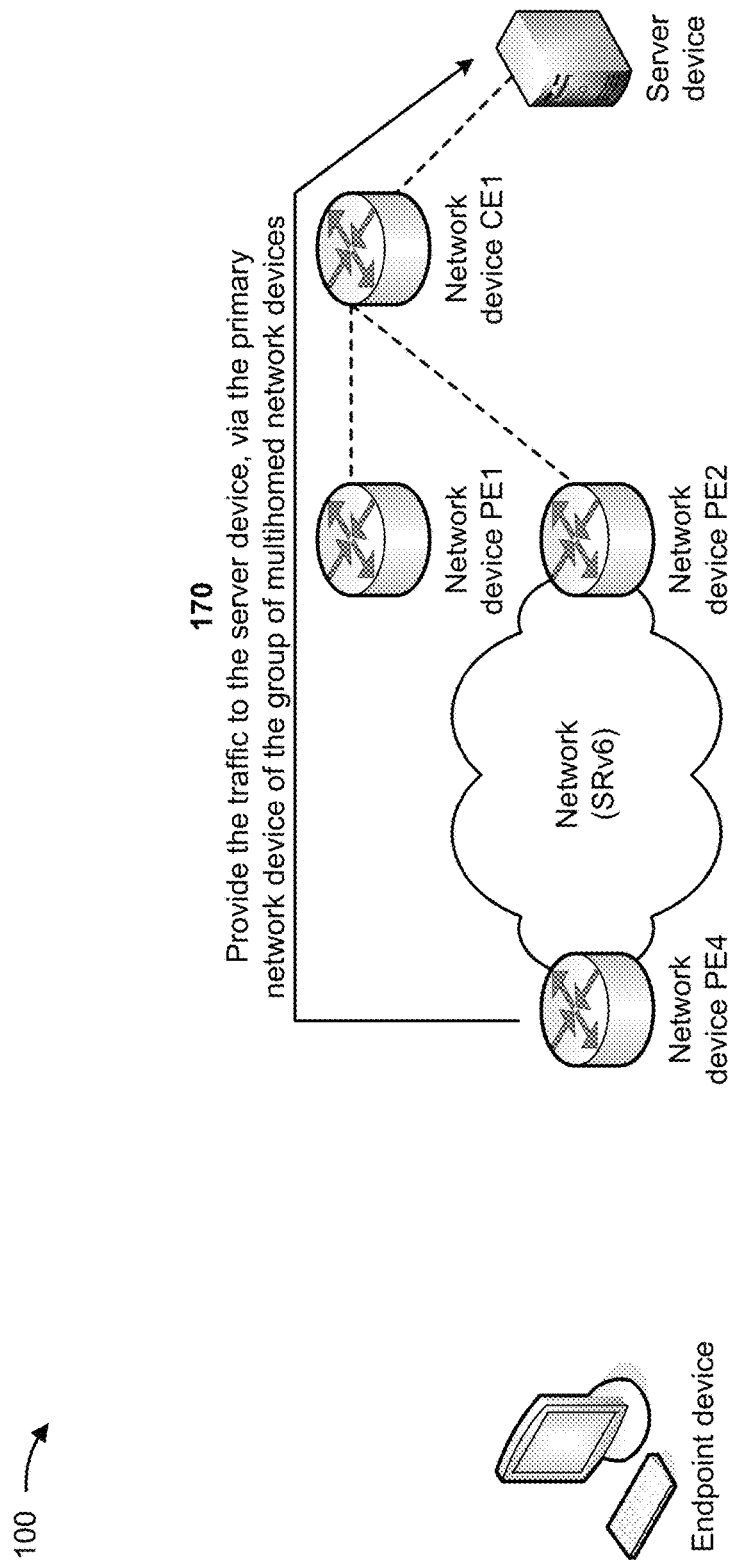

As shown in FIG. 1I, and by reference number 170, the network device of the PE network may provide the traffic to the server device, via the primary network device of the group of multihomed network devices. For example, when the fourth PE network device determines that the primary network device (e.g., the first PE network device) of the group of multihomed network devices is available, the fourth PE network device may provide the traffic through the network and to the first PE network device. The first PE network device may provide the traffic to the first CE network device, and the first CE network device may provide the traffic to the server device.

Figure 1J:
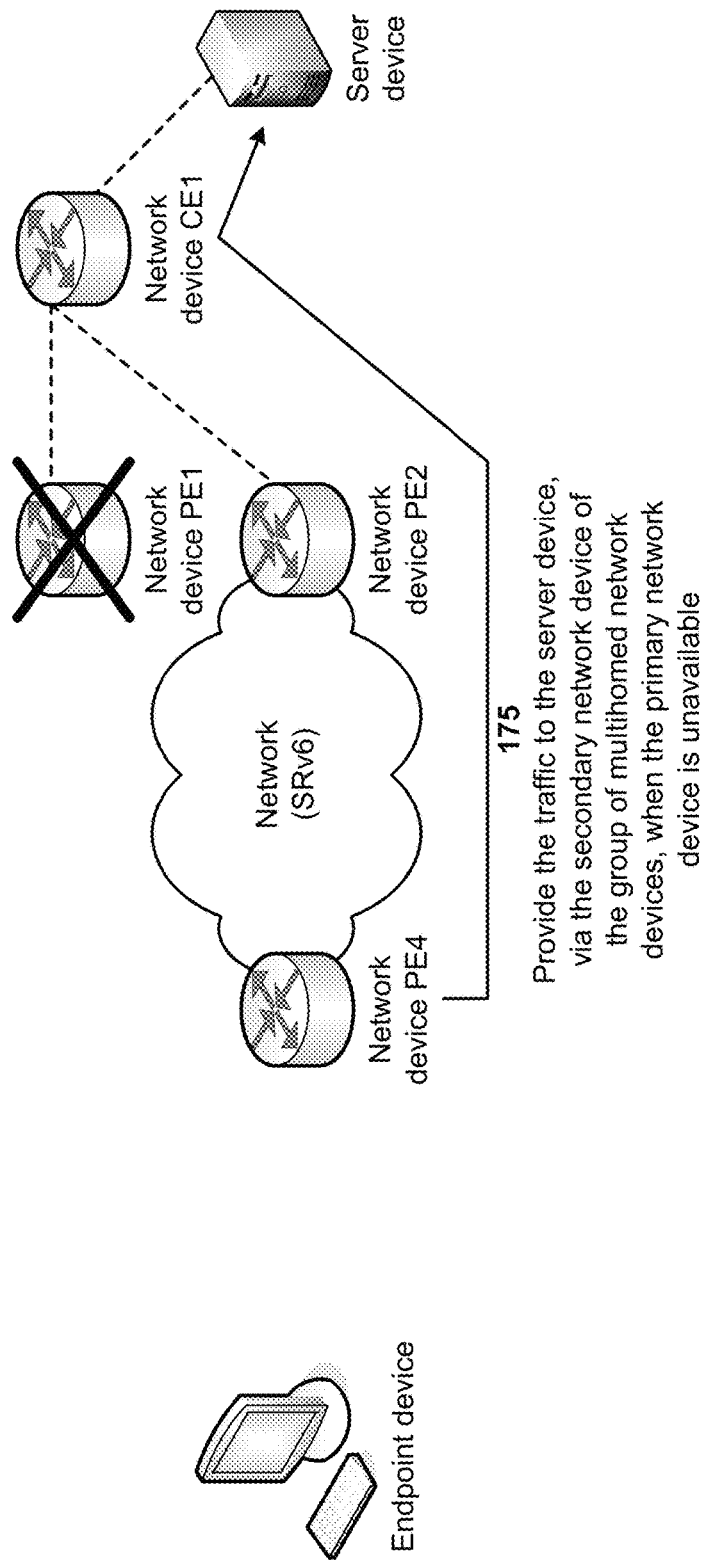

As shown in FIG. 1J, and by reference number 175, the network device of the PE network may provide the traffic to the server device, via the secondary network device of the group of multihomed network devices, when the primary network device is unavailable. For example, when the fourth PE network device determines that the primary network device (e.g., the first PE network device) of the group of multihomed network devices is unavailable, the fourth PE network device may provide the traffic through the network and to the second PE network device. The second PE network device may provide the traffic to the first CE network device, and the first CE network device may provide the traffic to the server device.

In this way, the network device dynamically detects multihomed network devices and allocates protection group identifiers. For example, the network device defines procedures to automate the process of identifying multihomed services and allocating a protection group identifier specific to a group of multihomed network devices. The network device may generate and manage a protection group identifier database, and may generate advertisements with protection group identifier information in the BGP. The network device may generate advertisements of protection group identifier pools and anycast segment identifier pools in the IGP for conflict avoidance, and may provide an efficient solution for SRv6 that does not use protection group tables. The network device may also provide an SR-MPLS solution that avoids protection group labels with the use of UHP anycast segment identifiers. Thus, the network device conserves computing resources, networking resources, and/or the like that would otherwise have been consumed by delaying traffic transmission through a network due to an egress link failure and/or an egress network device failure, losing traffic due to an egress link failure and/or an egress network device failure, handling lost traffic caused by an egress link failure and/or an egress network device failure, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
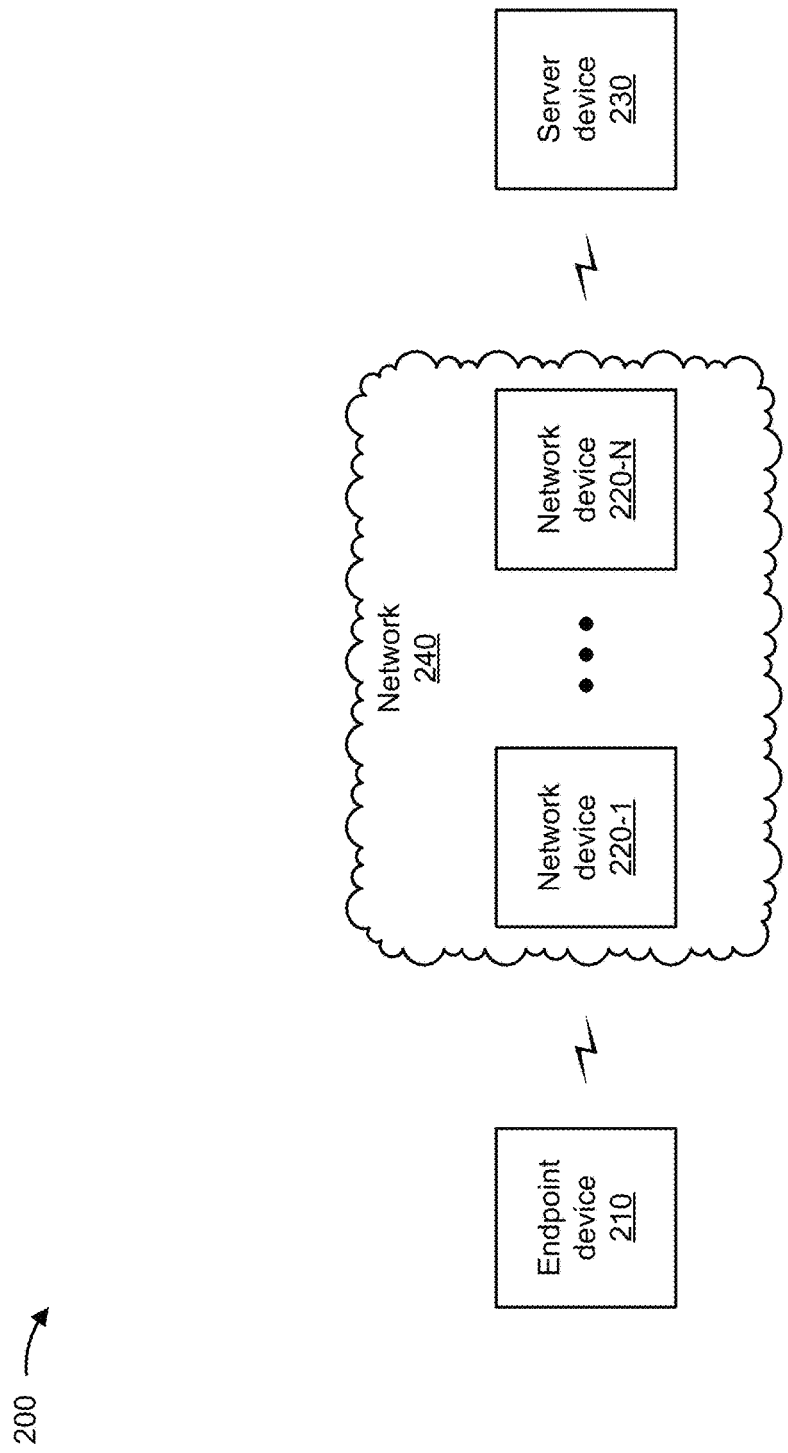
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a set-top box, a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device (e.g., a router, a residential gateway, and/or the like), or a similar type of device. In some implementations, the endpoint device 210 may receive network traffic from and/or may provide network traffic to other endpoint devices 210, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, and/or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
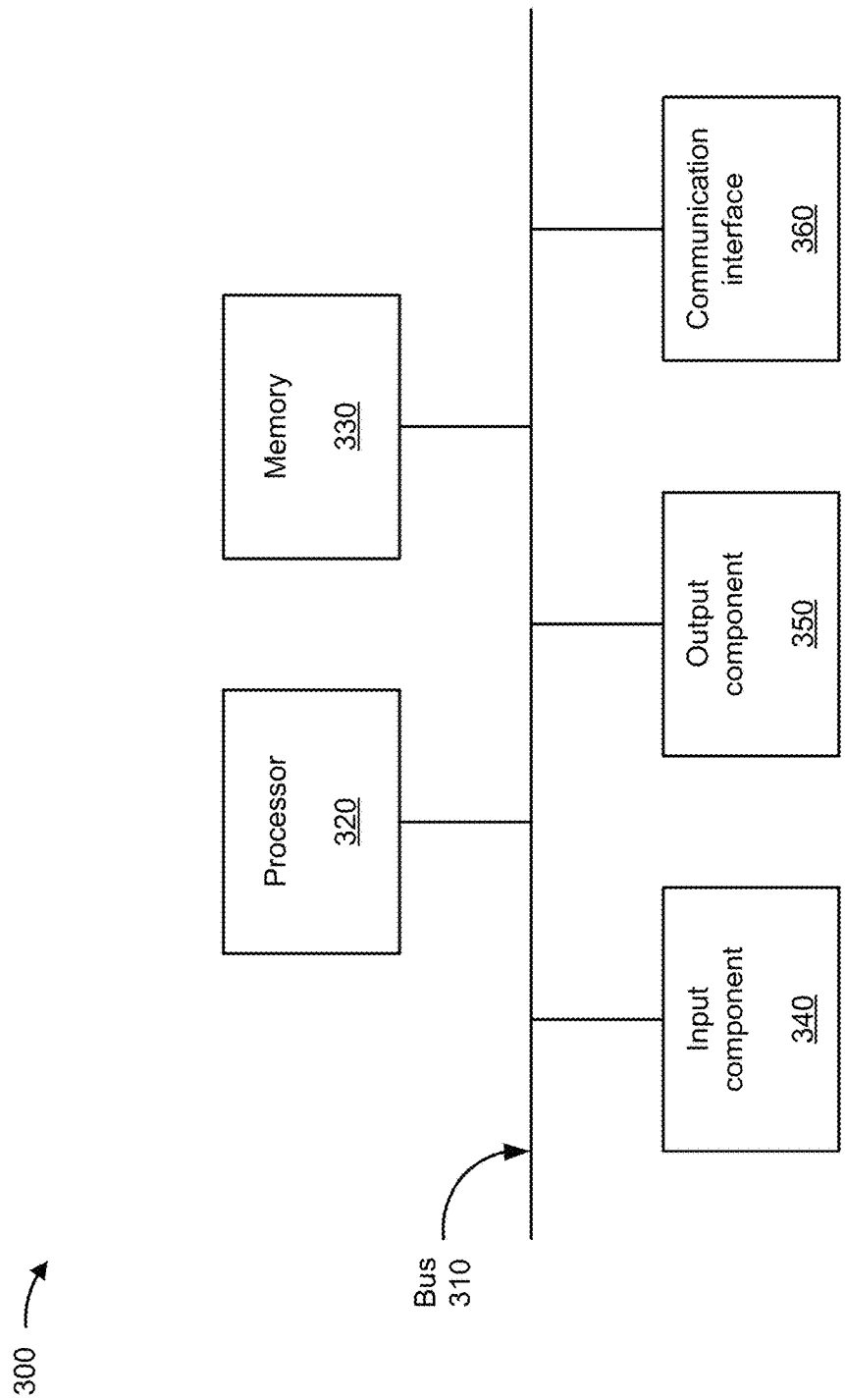
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
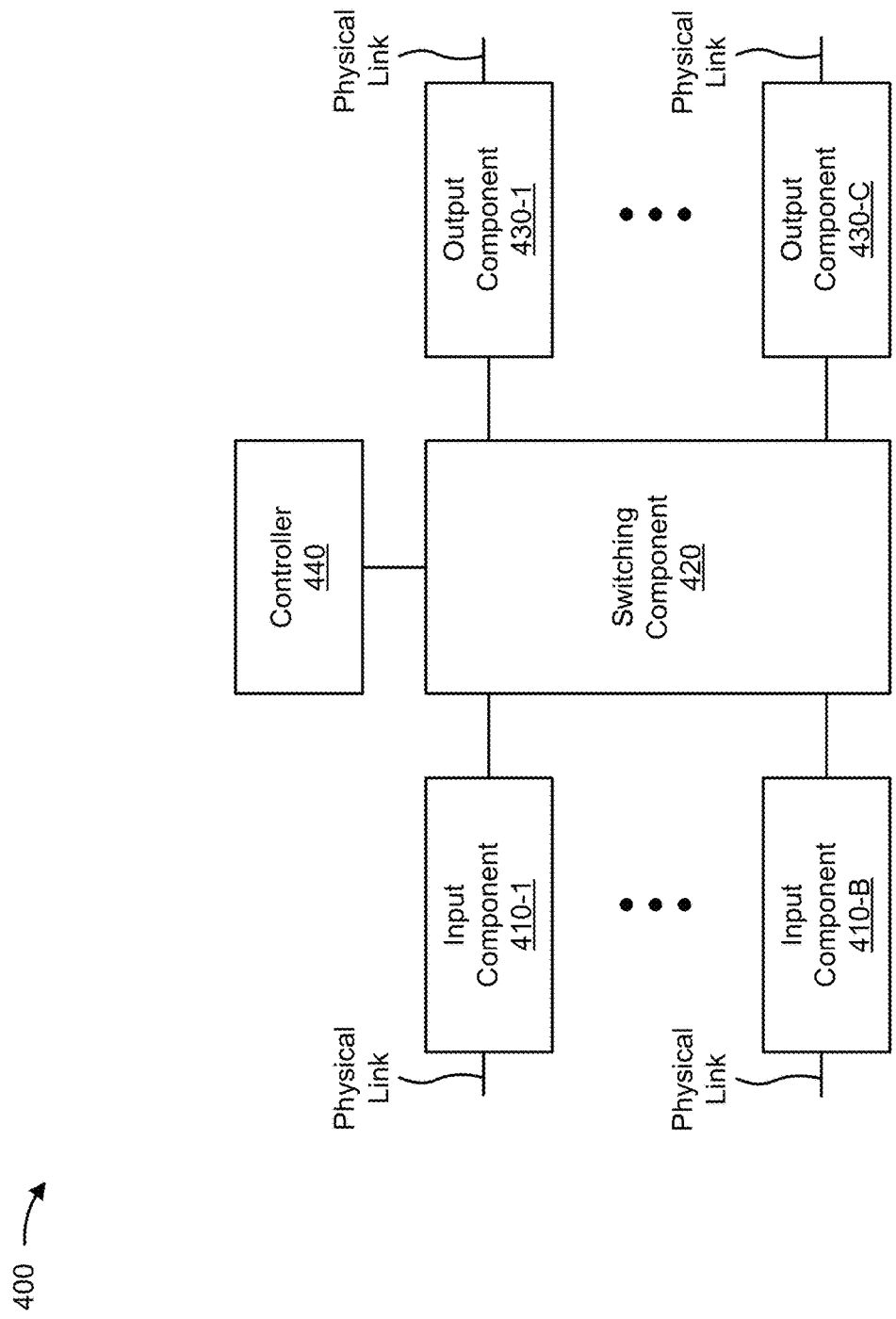

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for dynamically detecting multihomed network devices and allocating protection group identifiers. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving a first advertisement of a network destination from a second network device (block 510). For example, the first network device may receive a first advertisement of a network destination from a second network device, as described above. In some implementations, the network destination is associated with an entire customer site.

As further shown in FIG. 5, process 500 may include detecting multihoming with the second network device based on receiving the first advertisement of the network destination (block 520). For example, the first network device may detect multihoming with the second network device based on receiving the first advertisement of the network destination, as described above.

As further shown in FIG. 5, process 500 may include enabling egress protection for the multihoming, wherein the second network device is to detect the multihoming with the first network device and to enable the egress protection for the multihoming (block 530). For example, the first network device may enable egress protection for the multihoming, as described above. In some implementations, the second network device is to detect the multihoming with the first network device and to enable the egress protection for the multihoming.

As further shown in FIG. 5, process 500 may include allocating, from a first pool, a protection group identifier for a group of multihomed network devices that include the first network device and the second network device (block 540). For example, the first network device may allocate, from a first pool, a protection group identifier for a group of multihomed network devices that include the first network device and the second network device, as described above. In some implementations, one of the first network device or the second network device is a primary network device for the group of multihomed network devices. In some implementations, the protection group identifier includes an anycast Internet protocol version 4 address or an anycast Internet protocol version 6 address. In some implementations, when the network is a segment routing over multiprotocol label switching network, a segment identifier for the anycast Internet protocol version 4 address or an anycast Internet protocol version 6 address is utilized as the protection group identifier in the traffic. In some implementations, the first pool for the first network device is disjoint from a first pool for the second network device.

As further shown in FIG. 5, process 500 may include allocating, from a second pool, a network destination identifier for the network destination (block 550). For example, the first network device may allocate, from a second pool, a network destination identifier for the network destination, as described above.

As further shown in FIG. 5, process 500 may include providing, to a network and the second network device, a second advertisement that includes the protection group identifier and the network destination identifier, wherein the second network device is to readvertise, to the network, the network destination with the protection group identifier and the network destination identifier allocated by the first network device, and to install forwarding state to forward traffic with the protection group identifier and the network destination identifier, allocated by the first network device, to the network destination, and wherein the protection group identifier and the network destination identifier causes the network to direct traffic destined for the network destination, via the group of multihomed network devices (block 560). For example, the first network device may provide, to a network and the second network device, a second advertisement that includes the protection group identifier and the network destination identifier, as described above. In some implementations, the second network device may readvertise, to the network, the network destination with the protection group identifier and the network destination identifier allocated by the first network device, and may install forwarding state to forward traffic with the protection group identifier and the network destination identifier, allocated by the first network device, to the network destination. In some implementations, the protection group identifier and the network destination identifier causes the network to direct traffic destined for the network destination, via the group of multihomed network devices. In some implementations, the network is a segment routing over multi-protocol label switching network or a segment routing over Internet protocol version 6 network. In some implementations, the second advertisement includes a border gateway protocol advertisement. In some implementations, the network is a provider network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a first network device, a first advertisement of a network destination from a second network device;
  detecting, by the first network device, multihoming with the second network device based on receiving the first advertisement of the network destination;
  enabling, by the first network device, egress protection for the multihoming,
    wherein the second network device is to detect the multihoming with the first network device and to enable the egress protection for the multihoming;
  allocating, by the first network device and from a first pool, a protection group identifier for a group of multihomed network devices that include the first network device and the second network device;
  allocating, by the first network device and from a second pool, a network destination identifier for the network destination; and
  providing, by the first network device and to a network and the second network device, a second advertisement that includes the protection group identifier and the network destination identifier,
    wherein the second network device is to readvertise, to the network, the network destination with the protection group identifier and the network destination identifier allocated by the first network device, and to install forwarding state to forward traffic with the protection group identifier and the network destination identifier, allocated by the first network device, to the network destination,
    wherein the protection group identifier and the network destination identifier causes the network to direct traffic destined for the network destination, via the group of multihomed network devices.

2. The method of claim 1, wherein the network is a segment routing over multi-protocol label switching network or a segment routing over Internet protocol version 6 network.

3. The method of claim 1, wherein one of the first network device or the second network device is a primary network device for the group of multihomed network devices.

4. The method of claim 1, wherein the protection group identifier includes an anycast Internet protocol version 4 address or an anycast Internet protocol version 6 address.

5. The method of claim 4, wherein, when the network is a segment routing over multi-protocol label switching network, a segment identifier for the anycast Internet protocol version 4 address or an anycast Internet protocol version 6 address is utilized as the protection group identifier in the traffic.

6. The method of claim 1, wherein the first pool for the first network device is disjoint from a first pool for the second network device.

7. The method of claim 1, wherein the network destination is associated with an entire customer site.

8. A first network device, comprising:
one or more memories; and
one or more processors to:
receive a first advertisement of a network destination from a second network device;
detect multihoming with the second network device based on receiving the first advertisement of the network destination;
enable egress protection for the multihoming,
wherein the second network device is to detect the multihoming with the first network device and to enable the egress protection for the multihoming;
allocate, from a first pool, a protection group identifier for a group of multihomed network devices that include the first network device and the second network device;
allocate, from a second pool, a network destination identifier for the network destination; and
provide, to a network and the second network device, a second advertisement that includes the protection group identifier and the network destination identifier,
wherein the second network device is to readvertise, to the network, the network destination with the protection group identifier and the network destination identifier allocated by the first network device, and to install forwarding state to forward traffic with the protection group identifier and the network destination identifier, allocated by the first network device, to the network destination,
wherein the protection group identifier and the network destination identifier causes the network to direct traffic destined for the network destination, via the group of multihomed network devices.

9. The first network device of claim 8, wherein the network is a segment routing over multi-protocol label switching network or a segment routing over Internet protocol version 6 network.

10. The first network device of claim 8, wherein one of the first network device or the second network device is a primary network device for the group of multihomed network devices.

11. The first network device of claim 8, wherein the protection group identifier includes an anycast Internet protocol version 4 address or an anycast Internet protocol version 6 address.

12. The first network device of claim 8, wherein the first pool for the first network device is disjoint from a first pool for the second network device.

13. The first network device of claim 8, wherein the second advertisement includes a border gateway protocol advertisement.

14. The first network device of claim 8, wherein the network is a provider network.

15. A non-transitory computer-readable medium storing a set of instructions, the set of instructions comprising:
one or more instructions that, when executed by one or more processors of a first network device, cause the first network device to:
receive a first advertisement of a network destination from a second network device;
detect multihoming with the second network device based on receiving the first advertisement of the network destination;
enable egress protection for the multihoming,
wherein the second network device is to detect the multihoming with the first network device and to enable the egress protection for the multihoming;
allocate, from a first pool, a protection group identifier for a group of multihomed network devices that include the first network device and the second network device;
allocate, from a second pool, a network destination identifier for the network destination; and
provide, to a network and the second network device, a second advertisement that includes the protection group identifier and the network destination identifier,
wherein the second network device is to readvertise, to the network, the network destination with the protection group identifier and the network destination identifier allocated by the first network device, and to install forwarding state to forward traffic with the protection group identifier and the network destination identifier, allocated by the first network device, to the network destination,
wherein the protection group identifier and the network destination identifier causes the network to direct traffic destined for the network destination, via the group of multihomed network devices.

16. The non-transitory computer-readable medium of claim 15, wherein the network is a segment routing over multi-protocol label switching network or a segment routing over Internet protocol version 6 network.

17. The non-transitory computer-readable medium of claim 15, wherein one of the first network device or the second network device is a primary network device for the group of multihomed network devices.

18. The non-transitory computer-readable medium of claim 15, wherein the protection group identifier includes an anycast Internet protocol version 4 address or an anycast Internet protocol version 6 address.

19. The non-transitory computer-readable medium of claim 15, wherein the first pool for the first network device is disjoint from a first pool for the second network device.

20. The non-transitory computer-readable medium of claim 15, wherein the second advertisement includes a border gateway protocol advertisement.

* * * * *